United States Patent
Yonker et al.

(10) Patent No.: US 8,023,963 B2
(45) Date of Patent: Sep. 20, 2011

(54) MOBILE COMMUNICATION DEVICE AND METHOD FOR LINKING COMMUNICATIONS WITH LOCATION DATA

(75) Inventors: Jason B. Yonker, Lee's Summit, MO (US); Charles L. Bartel, Overland Park, KS (US)

(73) Assignee: Garmin Switzerland GmbH (CH)

( * ) Notice: Subject to any disclaimer, the term of this patent is extended or adjusted under 35 U.S.C. 154(b) by 917 days.

(21) Appl. No.: 12/015,834

(22) Filed: Jan. 17, 2008

(65) Prior Publication Data

US 2009/0186628 A1 Jul. 23, 2009

(51) Int. Cl.
*H04W 24/00* (2009.01)
(52) U.S. Cl. .............. 455/456.1; 455/456.6; 455/457
(58) Field of Classification Search ............ 455/456.1, 455/456.6, 457; 340/995.1
See application file for complete search history.

(56) References Cited

U.S. PATENT DOCUMENTS

| | | | |
|---|---|---|---|
| 6,845,318 B1 | 1/2005 | Moore et al. | |
| 7,256,711 B2 | 8/2007 | Sheha et al. | 340/995.1 |
| 2005/0153747 A1 | 7/2005 | Egami et al. | 455/567 |
| 2006/0141996 A1* | 6/2006 | Huh | 455/414.1 |
| 2007/0117594 A1 | 5/2007 | Ong et al. | 455/566 |

FOREIGN PATENT DOCUMENTS

KR 10-2006-0124152 12/2006

OTHER PUBLICATIONS

International Search Report from corresponding International Application No. PCT/US2009/030958, dated Aug. 26, 2009.
Garmin's NavTalk Cellular Phone/GPS Receiver Owner's Manual and Reference Guide, pp. 25-27 and 59, Jan. 2000.
Garmin's Nüvi 310/360 Owner's Manual, p. 28, Mar. 2006.

* cited by examiner

*Primary Examiner* — Dwayne Bost
*Assistant Examiner* — Larry Sternbane
(74) *Attorney, Agent, or Firm* — Samuel M. Korte (57) ABSTRACT

An electronic device includes a communication component; a location-determining component; a display; and a computing device all housed within a portable, handheld housing or other enclosure. The communications component transmits and receives mobile communications over a wireless communication network or path and provides identification information to the computing device. The location determining component determines locations of the electronic device as it is carried or driven from place to place and provides corresponding location data to the computing device. The computing device links the identification information with the location data to indicate the location of the device when a communication was made or received. The identification information and location data may be linked by adding a geocode or geotag to the identification information or by cross-referencing the information and data in a database. The computing device may also display a representation of the location data alongside a representation of the communication on a cartographic map and then display some of the identification information for the communication when a user scrolls over or otherwise selects either of the representations.

11 Claims, 9 Drawing Sheets

| COMMUNICATIONS | LOCATION |
|---|---|
| IC: 816-474-XXXX, Received 12/22/07 9:08 P.M. 12 Minutes | Start: 38.82, 94.88 End: 38.85, 94.90 |
| IM: 816-213-XXXX, Received 12/22/07 9:30 A.M. | 38.81, 94.97 |
| VM: 806-374-XXXX, Received 12/24/07 9:30 P.M. | 38.84, 95.02 |

*Fig. 7.*

| COMMUNICATIONS | LOCATION |
|---|---|
| IC: 816-474-XXXX, Received 12/22/07 9:08 P.M. 12 Minutes | Start: 11519 W. 95th Street Overland Park, KS. End: 1200 E. 151st Street Olathe, KS. |
| IM: 816-213-XXXX, Received 12/22/07 9:30 A.M. | 135th and Quivira Overland Park, KS. |
| VM: 806-374-XXXX, Received 12/24/07 9:30 P.M. | College and Antioch Overland Park, KS. |

MOBILE COMMUNICATION DEVICE AND METHOD FOR LINKING COMMUNICATIONS WITH LOCATION DATA

BACKGROUND

The present invention relates to electronic devices such as navigation devices, cellular phones, and the like. More particularly, the invention relates to a device and method for linking communications received by an electronic device with location data.

Mobile phones equipped with or attached to GPS receivers or other location-determining components are becoming increasingly popular because they allow users to make and receive phone calls and navigate to desired locations with a single electronic device rather than two. Up to now, however, these combined devices have provided few synergies, with each component basically operating the same way it does as a stand-alone device.

SUMMARY

The present invention provides a distinct advance in the art of GPS-enabled mobile phones and similar devices by providing such a device with operational features not found in either stand-alone mobile phones or navigational devices. Embodiments of the present invention may be implemented with an electronic device that includes a communication component; a location-determining component; a display; and a computing device all housed within a portable, handheld enclosure.

The communications component transmits and receives mobile communications over a wireless communication network or path. In one embodiment, the communications component is a cellular transceiver that transmits and receives mobile phone calls, text messages, instant messages, voicemail messages, and other communications over a cellular telephone network.

The location determining component determines locations of the electronic device as it is carried or driven from place to place and provides corresponding location data to the computing device. In one embodiment, the location-determining component is a GPS receiver that receives satellite signals from a plurality of GPS satellites and determines location information as a function of the satellite signals.

The computing device is coupled with the communications component for receiving identification information related to communications received by or transmitted from the device. The identification information may include, for example, a calling party's phone number, the date and time of the call, and the duration of the call.

The computing device is also coupled with the location-determining component for receiving location data therefrom. The location data may include, for example, data that identifies the location or approximate location of the device at the time or approximate time an incoming communication is received by the communication component. The location data may also identify the location of the electronic device when an incoming communication has ended and at intermediate locations.

In accordance with one aspect of the invention, the computing device links the identification information for an incoming communication with the location data to indicate the location of the device when the incoming communication was received. The identification information and location data may be linked by adding a geocode or geotag to the identification information or by cross-referencing the information and data in a database.

The computing device may also display a representation of the location data alongside a representation of the communication. For example, the computing device may display a cartographic map and a location symbol or other marker on the map to denote the position of the device when an incoming call was received. A user may then scroll over or otherwise select the marker to retrieve and display some of the identification information for the communication such as the caller's phone number.

The computing device may also display a list of communications sorted by the distance between the user's current location and the user's location when the communications were transmitted or received. Similarly, the list of communications may be sorted based on their distance from some user-specified location such as a shopping mall.

The device may also display a chronologically-ordered communication log. A user may then select a communication from the list to view the location of the device when the communication was received or transmitted. The location may be a textual description or shown on a map.

Embodiments of the invention may be used, for example, when a user receives a phone call or misses a phone call while at a location or performing an activity (e.g., shopping at a shopping mall). The user may want to return the call later but may not remember the phone number of the calling party or the day and time the call was received. The user may remember, however, where he or she was when the call was received or missed. The user may then view a map with makers denoting the positions of the device when incoming calls were received. The user can scroll over or otherwise select any of the markers (such as a marker located at a mall) to obtain identification information for the call received when the device was at that location. The computing device may also automatically dial the phone number of the calling party or perform some other function when the user selects or otherwise interacts with the marker.

These and other aspects of the present invention are described more fully in the detailed description below.

BRIEF DESCRIPTION OF THE DRAWING FIGURES

Embodiments of the present invention are described in detail below with reference to the attached drawing figures, wherein.

The drawing figures do not limit embodiments of the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawing figures that illustrate specific embodiments in which the present invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense.

Figure 1:
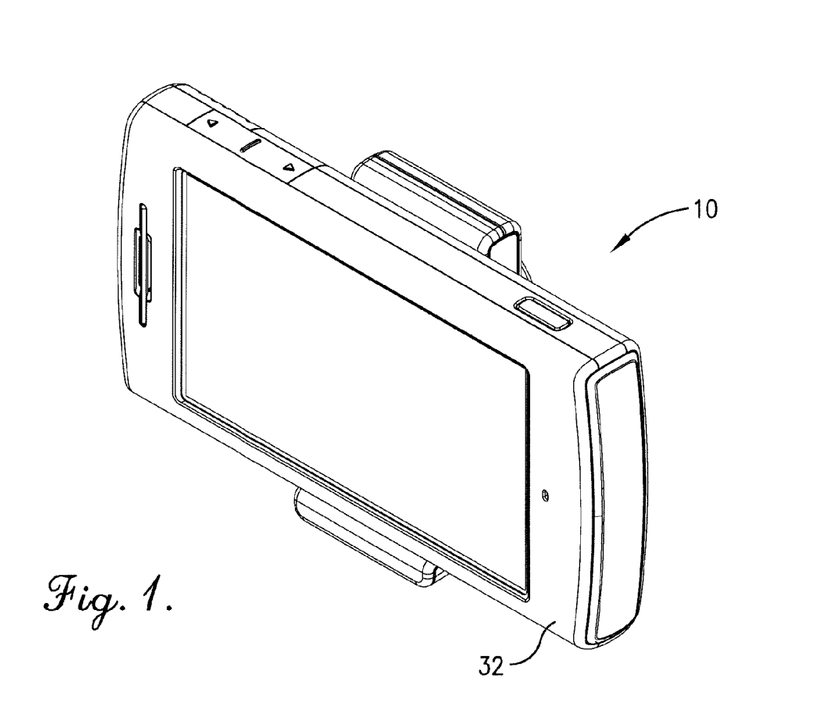
FIG. 1 is an isometric view of an electronic device that may be used to implement exemplary embodiments of the present invention.

Embodiments of the present invention can be implemented in hardware, software, firmware, or a combination thereof. In one embodiment, the invention is implemented with an electronic device 10, an example of which is illustrated in FIG. 1. The electronic device 10 may be any device operable to transmit and receive communications and to receive, utilize, or otherwise determine geographic information such as a current location of the device.

In an exemplary embodiment, the electronic device 10 is a location-enabled communication device such as a GPS-enabled mobile phone. The electronic device 10 and its components illustrated and described herein are merely examples of a device and components that may be used to implement the present invention and may be replaced with other devices and components without departing from the scope of the present invention.

Figure 2:
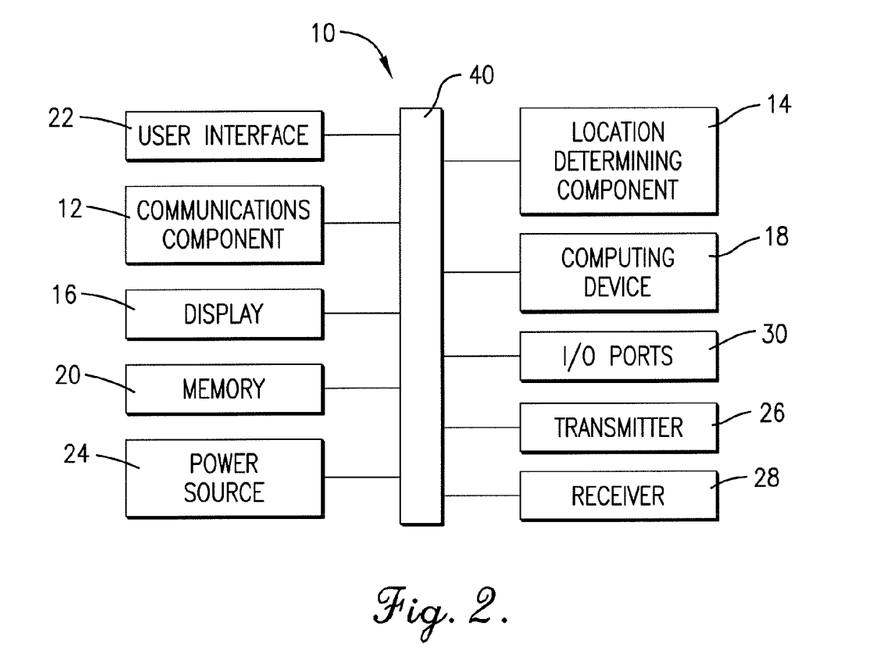
FIG. 2 is a block diagram illustrating certain components of the device of FIG. 1.

As best illustrated in FIG. 2, an exemplary embodiment of the electronic device 10 may include a communication component 12, a location-determining component 14, a display 16, and a computing device 18. The electronic device 10 may also include memory 20, a user interface 22, a power source 24, a transmitter 26, a receiver 28, one or more I/O ports 30, and a housing 32 for housing the various components of the device 10.

The communications component 12 enables the device 10 to communicate with other electronic devices through a communication network, such as the Internet, a local area network, a wide area network, an ad hoc or peer to peer network, or a direct connection such as a USB, Firewire, or Bluetooth™ connection, etc. The communications component 12 may communicate utilizing wireless data transfer methods such as WiFi (802.11), Wi-Max, Bluetooth™, ultra-wideband, infrared, cellular telephony, radio frequency, etc.

The communications component 12 may make and receive any communications including incoming and outgoing phone calls, text messages, instant messages, voicemail messages, e-mail messages, missed phone calls, and any other known communications.

The communications component 12 also receives or generates identification information related to the communications. For example, the identification information for an incoming phone call may include the calling party's phone number, the calling party's name or other identification (ID), the time and date of receipt of the call, the duration of the call, and the ending time of the call. Similarly, for an outgoing call, the identification information may include the called party's phone number and name, the date and time the call was made, and the date and time the call ended. The identification information may be embedded with the communications in in-band or out-of-band signaling. Some of the identification information, such as the duration of calls, may be generated by the computing device 18 or other components of the electronic device 10.

The identification information is generated by or sent to the computing device 18 or stored in memory coupled with or accessible by the computing device such as the memory 20. As explained in more detail below, the computing device then links or otherwise associates the identification information with location data generated by the location-determining component 14.

In one embodiment, the communications component 12 is a cellular transceiver for transmitting and receiving communications over a cellular phone network such as those operated by Sprint®, AT&T®, Verizon®, and other companies. The cellular phone network may operate with GSM (Global System for Mobile communications), CDMA (Code Division Multiple Access), or any other known standards.

The communications component 12 may also permit communications over several different networks. For example, the device 10 may be operable to transmit and receive communications over a cellular network, a short-range FM radio network, and a WiFi network.

The location determining component 14 determines locations of the device 10 as it is carried or otherwise moved from place to place and generates and sends corresponding location data to the computing device 18 so that it may be linked or otherwise associated with the identification information for the communications as described in more detail below. The location data may include data which identifies the location of the electronic device 10 at the time (or approximate time) a communication is received by or transmitted from the communication component 12. In one embodiment, the location determining component may be a global positioning (GPS) receiver much like those provided in products by GARMIN INTERNATIONAL, INC.

Figure 3:
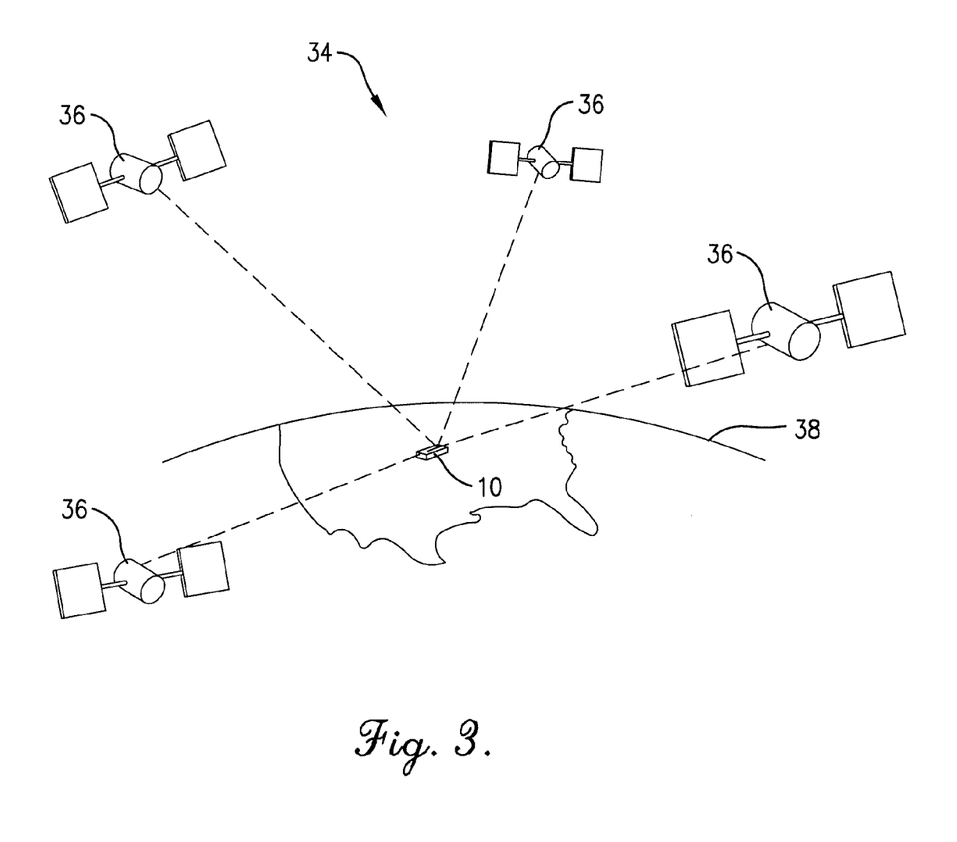
FIG. 3 is schematic diagram of a Global Positioning System (GPS) that may be used to send GPS signals to the electronic device.

FIG. 3 shows a representative view of a GPS denoted generally by reference numeral 34. A plurality of satellites 36 are in orbit about the Earth 38. The orbit of each satellite is not necessarily synchronous with the orbits of other satellites and, in fact, is likely asynchronous. A GPS receiver device such as the electronic device 10 is shown receiving spread spectrum GPS satellite signals from the various satellites 36.

The spread spectrum signals continuously transmitted from each satellite 36 utilize a highly accurate frequency standard accomplished with an extremely accurate atomic clock. Each satellite 36, as part of its data signal transmission, transmits a data stream indicative of that particular satellite. The device 10 must acquire spread spectrum GPS satellite signals from at least three satellites for the GPS receiver device to calculate its two-dimensional position by triangulation. Acquisition of an additional signal, resulting in signals from a total of four satellites, permits the device 10 to calculate its three-dimensional position.

The location determining component 14 and the computing device 18 are operable to receive navigational signals from the GPS satellites 36 and to calculate positions of the device 10 as a function of the signals. The location determining component 14 and computing device 18 may also determine track logs or any other series of geographic coordinates corresponding to points along a path traveled by a user of the device 10. The location determining component 14 and/or the computing device 18 are also operable to calculate routes to desired locations, provide instructions to navigate to the desired locations, display maps and other information on the display screen 16, and to execute other functions described herein.

The location determining component 14 may include an antenna to assist in receiving the satellite signals. The antenna may be a patch antenna, a linear antenna, or any other type of antenna that can be used with navigational devices. The antenna may be mounted directly on or in the housing 32 or may be mounted external to the housing.

Although one embodiment of the electronic device 10 includes a GPS receiver, it will be appreciated that other location-determining technology may be used. For example, a receiver suitable for use with other global navigation satellite systems (GNSS) may be used instead or in addition to the GPS receiver. Alternatively, the communications component 12 may be used to determine the location of the device 10 by receiving data from at least three transmitting locations and then performing basic triangulation calculations to determine the relative position of the device 10 with respect to the transmitting locations. For example, cellular towers or any customized transmitting radio frequency towers can be used instead of satellites. With such a configuration, any standard geometric triangulation algorithm can be used to determine the location of the electronic device 10.

In other embodiments, the location determining component 14 need not directly determine the current geographic location of the device 10. For instance, the location determining component 14 may determine the current geographic location by receiving location information directly from the user, through a communications network, or from another electronic device.

The location determining component 14 may include one or more processors, controllers, or other computing devices and memory so that it may calculate location and other geographic information without the computing device 18 or it may utilize the components of the computing device 18. Further, the location determining component 14 may be integral with the computing device 18 such that the location determining component 14 may be operable to specifically perform the various functions described herein. Thus, the computing device 18 and location determining component 14 can be combined or be separate or otherwise discrete elements.

The display 16 is coupled with the computing device 16 and is operable to display various information corresponding to the device 10, such as maps, locations, and directions as described below. The display 16 may comprise conventional black and white, monochrome, or color display elements including, but not limited to, Liquid Crystal Display (LCD), Thin Film Transistor (TFT) LCD, Polymer Light Emitting Diode (PLED), Organic Light Emitting Diode (OLED) and/or plasma display devices. Preferably, the display 16 is of sufficient size to enable the user to easily view it while driving.

The display 16 may be integrated with the user interface 22, such as in embodiments where the display 16 is a touchscreen display to enable the user to interact with it by touching or pointing at display areas to provide information to the device 10.

The computing device 18 may include any number of processors, controllers, integrated circuits, programmable logic devices, or other computing devices and resident or external memory for storing data and other information accessed and/or generated by the device 10. The computing device 18 is preferably coupled with the communications component 12, the location determining component 14, the display 16, the memory 20, the user interface 22, and other components through wired or wireless connections, such as a data bus 40, to enable information to be exchanged between the various components.

The computing device 18 may implement a computer program and/or code segments to perform the functions described herein. The computer program may comprise an ordered listing of executable instructions for implementing logical functions in the computing device. The computer program can be embodied in any computer-readable medium for use by or in connection with an instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a random access memory (RAM), a read-only memory (ROM), an erasable, programmable, read-only memory (EPROM or Flash memory), a portable computer diskette, and a portable compact disk read-only memory (CDROM).

The memory 20 may be integral with the location determining component 14, integral with the computing device 18, stand-alone memory, or a combination of both. The memory may include, for example, removable and non-removable memory elements such as RAM, ROM, Flash, magnetic, optical, USB memory devices, and/or other conventional memory elements.

The memory 20 may store various data associated with operation of the device 10, such as the computer program and code segments mentioned above, or other data for instructing the computing device 18 and other device elements to perform the steps described herein. Further, the memory 20 may store various cartographic data corresponding to geographic locations including map data, and map elements, such as thoroughfares, terrain, alert locations, points of interest, geographic entities, radio stations, and other navigation data to facilitate the various navigation functions provided by the device 10. Additionally, the memory 20 may store destination addresses and previously calculated or otherwise acquired routes to various destination addresses for later retrieval by the computing device 18.

The memory 20 or some other memory accessible by the computing device 18 stores cartographic information including known roads, road networks, road segments, intersections, hiking trails, tracks or any other known paths for which the geographic coordinates are known. As used herein, "roads" is meant to include all drivable surfaces including, but not limited to, highways, streets, boulevards, avenues, parkways, rural routes, terraces, and even private streets, driveways, and parking lots. The cartographic information may be pre-loaded in the memory 20 or other memory or may be downloaded to the device via the communications component 22, receiver 28, or I/O ports 30. For example, different cartographic information may be downloaded to the device based on a current location of the device as determined by the location determining component 14 or computing device 18.

The various data stored within the memory 20 may be associated within one or more databases to facilitate retrieval of the information. For example, the databases may be configured to enable the computing device 18 to automatically access the cartographic information based upon a current geographic location of the device 10 as discussed in more detail below.

A map-matching search engine, preferably comprised of software, firmware or the like executed by the computing device 18, may search through the database of cartographic information to find known roads or other known paths which match a series of geographical coordinates. A user may initiate a search or the search engine may automatically search the database based on a state of the device 10 such as the current position of the device 10. The search engine, or alternatively a separate computation engine (also preferably comprised of software, firmware or the like executed by the computing device 18), may also perform calculations related to the cartographic information. The map mapping search engine may also identify a map location, such as a street address or intersection, associated with one or more geographical coordinates.

The user interface 22 permits a user to operate the device 10 and enables users, third parties, or other devices to share information with the device 10. The user interface 22 is generally associated with the housing 32, such as by physical connection through wires, etc, or wirelessly utilizing conventional wireless protocols. The user interface 22 need not be physically coupled with the housing 32.

The user interface 22 may comprise one or more functionable inputs such as buttons, switches, scroll wheels, a touch screen associated with the display, voice recognition elements such as a microphone, pointing devices such as mice, touchpads, trackballs, styluses, a camera such as a digital or film still or video camera, combinations thereof, etc. Further, the user interface 22 may comprise wired or wireless data transfer elements such as removable memory including the memory 20, data transceivers, etc, to enable the user and other devices or parties to remotely interface with the device 10. The device 10 may also include a speaker for providing audible instructions and feedback.

The user interface 22 may be operable to provide various information to the user utilizing the display 16 or other visual or audio elements such as a speaker. Thus, the user interface 22 enables the user and device 10 to exchange information relating to the device 10, including geographic entities, configuration information, security information, preferences, route information, points of interests, alerts and alert notification, navigation information, waypoints, a destination address, etc.

The power source 24 is associated with the housing 32 to provide electrical power to various device 10 elements. For example, the power source 24 may be directly or indirectly coupled with the communications component 12, the location determining component 14, the display 16, the computing device 18, the memory 20, and the user interface 22. The power source 24 may comprise conventional power supply elements, such as batteries, battery packs, etc. The power source 24 may also comprise power conduits, connectors, and receptacles operable to receive batteries, battery connectors, or power cables. For example, the power source 24 may include both a battery to enable portable operation and a power input for receiving power from an external source such an automobile.

To preserve battery life, the GPS receiver or other location-determining component 14 may be switched off periodically. For example, the GPS receiver may be alternatively switched on for 30 seconds, off for two minutes, then back on for 30 seconds. If the location-determining component 14 determines the electronic device 10 is moving quickly (for example, if it is in a car or train), it may be switched on more frequently.

The transmitter 26 and receiver 28 may be provided to enable wireless transmission of information. The devices may be separate components or combined in a single transceiver assembly. For example, in exemplary embodiments, the device 10 includes a Frequency Modulated (FM) receiver for receiving information such as music, Radio Data system (RDS) information, FM Traffic Message Channel (TMC) information, direct band information such as MSN Direct™ data, or the like. Alternatively, or in addition, the transmitter 26 and receiver 28 assembly may comprise a short range transmitter and transmitter such as a Bluetooth™ receiver/transmitter assembly. The above-described functions of the transmitter 26 and receiver 28 may also be performed by the communications component 12 so that the transmitter 26 and receiver 28 are not needed.

The I/O ports 30 permit data and other information to be transferred to and from the computing device 18 and the location determining component 14. The I/O ports 30 may include a Secure Disk (SD) card slot, Mini SD Card slot, Micro SD Card slot or the like for receiving removable SD cards, Mini SD Cards, Micro SD Cards, or the like, and a USB port for coupling with a USB cable connected to another computing device such as a personal computer. Navigational software, cartographic maps and other data and information may be loaded in the device 10 via the I/O ports, the receiver 28, or the communications component 12.

The computing device 18 may also be coupled with a pedometer, accelerometer, compass, or other dead-reckoning components which allow it to determine the device's location when the location determining component 14 cannot receive satellite or other signals. This permits the device to link identification information for incoming communications with location data even when the electronic device is used indoors (for example, in a large shopping mall or airport).

The housing 32 may be handheld or otherwise portable to facilitate easy transport of the device 10. In some embodiments, the housing 32 may be configured for mounting within or on an automobile or other vehicle in a generally conventional manner. The housing 32 may be constructed from a suitable lightweight and impact-resistant material such as, for example, plastic, nylon, aluminum, or any combination thereof. The housing 32 may include one or more appropriate gaskets or seals to make it substantially waterproof or resistant. The housing 32 may take any suitable shape for size, and the particular size, weight and configuration of the housing may be changed without departing from the scope of the present invention.

The components shown in FIG. 2 and described herein need not be physically connected to one another since wireless communication among the various depicted components is permissible and intended to fall within the scope of the present invention.

In operation, the computing device 18 receives the identification information from the communications component 12 and/or from memory 20 and receives the location data from the location determining component 14 and then links the identification information with the location data. The identification information and location data may be linked by adding a geocode or geotag to the identification information. "Geocode" and "geotag" are used synonymously herein to refer to a geographical code operable to identify a point or area at or on the surface of the Earth. The geotags or geocodes are not limited to a particular format. In some embodiments, the generated geocodes may be embodied in a latitude and longitude format that corresponds to the latitude and longitude of a position on the Earth. Thus, in some embodiments, the geocodes may be in degree:minute, degree:minute:second, decimal degree format, and/or the Geographic Coordinate System (1993) format. The one or more generated geocodes may be stored by the computing device 18 within one or more computer-readable memories.

The geocodes may be generated from address databases, algorithms, look-up tables, or other applications and programs operable to convert, identify, locate, or otherwise define a geocode based on data acquired or generated by the location determining component 14. In some embodiments, the computing device 18 may access other devices to acquire the geocode and/or the computing device 18 may have information stored within its memory to enable the generation of a geocode from a given address.

Figure 7:
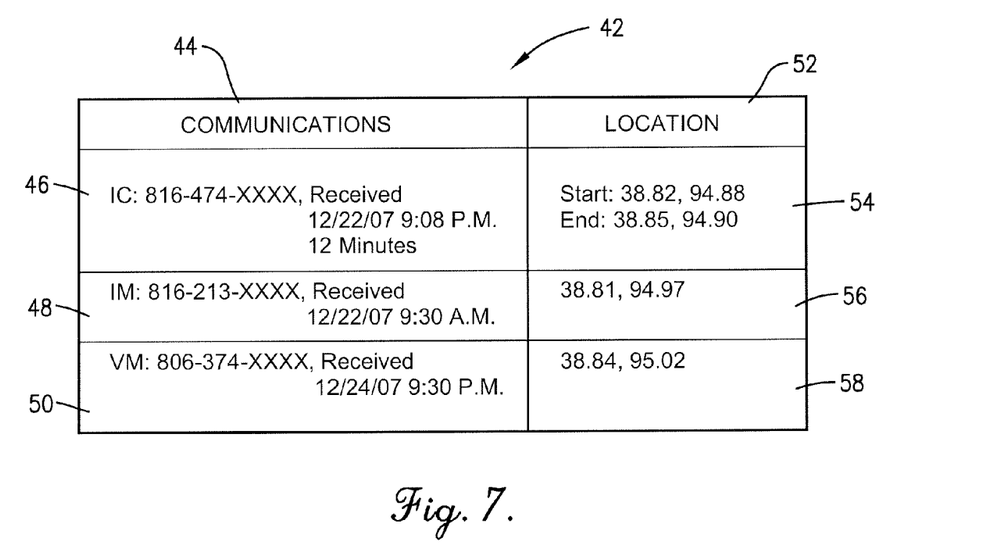
FIG. 7 is a sample database or information table that may be stored in or accessed by the electronic device.

The computing device 18 may also link the identification information with the location data by storing and cross-referencing the information and data in a database or table such as the database 42 shown in FIG. 7. The first column 44 of the database 42 lists identification information for all of the communications received by or transmitted from the electronic device 10 over a particular period of time (for example, during the current day). The first listing 46 in column 44 shows that an incoming call (IC) was received from the phone number 816-474-XXXX on Dec. 22, 2007 at 9:08 PM and lasted 12 minutes. Similarly, the second listing 48 shows that an instant message (IM) was received from 816-213-XXXX on Dec. 22, 2007 at 9:30 AM. Finally, the third listing 50 shows that a voicemail message (VM) was received from 816-374-XXXX on Dec. 24, 2007 at 9:30 PM.

The second column 52 of the database 42 lists the location data linked to the identification information. The first listing 54 in column 52 shows that the IC shown in listing 46 was received when the electronic device 10 was at latitude 38.82 and longitude 94.88 and ended when the electronic device was at latitude 38.85 and longitude 94.90. Similarly, the second listing 56 in column 52 shows that the IM shown in listing 48 was received when the electronic device 10 was at latitude 38.81 and longitude 94.97. Finally, the last listing 58 in column 52 shows that the VM shown in listing 50 was received when the electronic device 10 was at latitude 38.84 and longitude 95.02.

Figure 8:
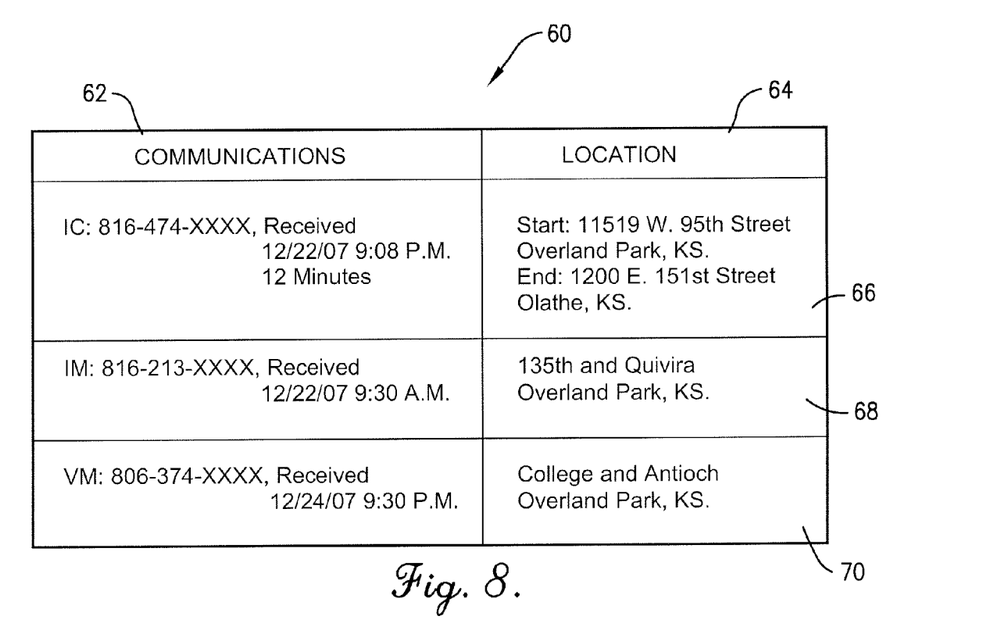
FIG. 8 is another sample database or information table that may be stored in or accessed by the electronic device.

The computing device 18 or other component of the electronic device 10 may also perform a map-matching procedure as described above to correlate the latitude and longitude location data shown in the second column 52 of FIG. 7 to map-based addresses or intersections. FIG. 8 illustrates a database 60 after such a map-mapping procedure. The first column 62 of the database 60 is the same as the first column 44 of the database 42. The second column 64 of the database 60 includes map-based location data which corresponds to the longitude and latitude location data of the second column 52 of the database 42. For example, the first listing 66 in database 60 shows the map-based addresses for the geographical coordinate shown in the first listing 54 of the database 42; the second listing 68 shows the addresses for the coordinates shown in the listing 56; and the third listing 70 shows the addresses for the coordinates shown in the listing 58. The particular geographical coordinates and the corresponding map-based addresses shown in FIGS. 7 and 8 are examples only and are not necessarily accurate.

The computing device 18 may also display a representation of the location data alongside a representation of the incoming call. In one embodiment, the computing device 18 displays a cartographic map and a location symbol or other marker on the map to denote the position of the device 10 when an incoming call was received. A user may then scroll over or otherwise select the marker to retrieve and display some of the identification information for the incoming call such as the caller's phone number.

Figure 4:
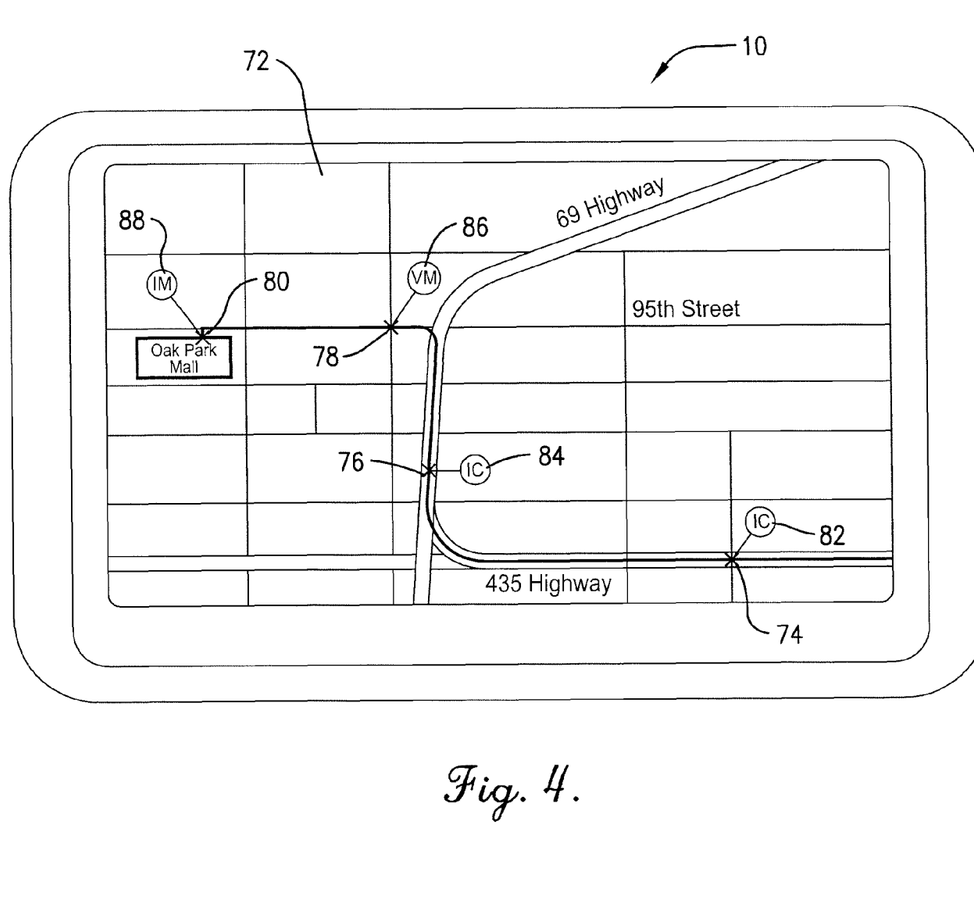
FIG. 4 is a sample screen display of the electronic device.

For example, a map 72 such as the one shown in FIG. 4 may be displayed. The map 72 shows conventional cartographic information such as streets, highways, and other roads. Location markers or other representations of where the electronic device was located when communications were received by or transmitted from the electronic device may be superimposed on the map. For example, FIG. 4 shows four markers, 74, 76, 78, 80 denoting that four communications were made or received at locations represented by the markers.

Representations of the communications may also be displayed on the map 72. For example, a marker 82 may denote that an incoming call was received by the electronic device when it was located at the position denoted by the marker 74. Similarly, a marker 84 may denote that an incoming call was received by the electronic device when it was located at the position denoted by the marker 76. Similarly, a marker 86 may denote that a voicemail message was received by the electronic device when it was located at the position denoted by the marker 78. Finally, a marker 88 may denote that an instant message was received by the device when it was located at the position denoted by the marker 80.

Any number of representations of the linked location data and identification information may be displayed on the map 72 or a similar map. For example, representations of the location data and identification information for all incoming communications received during the current day, week, or other time period may be displayed. The representations of the location data and the representations of the identification information may also be combined. For example, the marker 74 and the marker 82 may be combined into a single marker that both represents the location of the device when a call was received and some of the identification information for the call.

Figure 5:
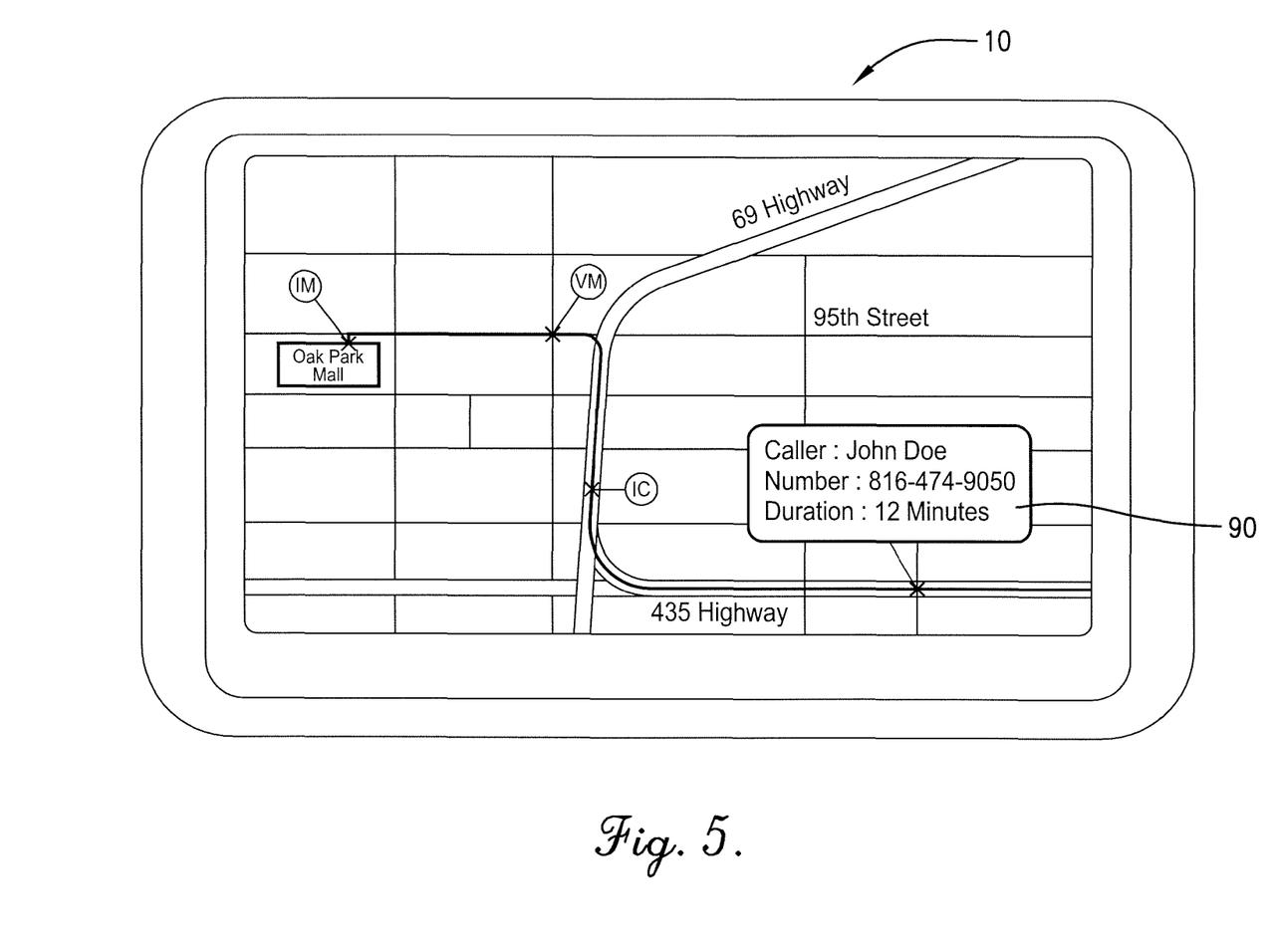
FIG. 5 is another sample screen display of the electronic device.

A user may scroll over or otherwise select any of the markers 74, 76, 78, 80, 82, 84, 86, 88 to obtain and display some of the location data and/or the identification information. For example, as shown in FIG. 5, an overlay 90 may be displayed when a user scrolls over the marker 74 or 82 in FIG. 4. The overlay 90 may show the name or ID of the calling party, the caller's phone number, the duration of the call, or any other identification information or location data associated with the call.

Figure 6:
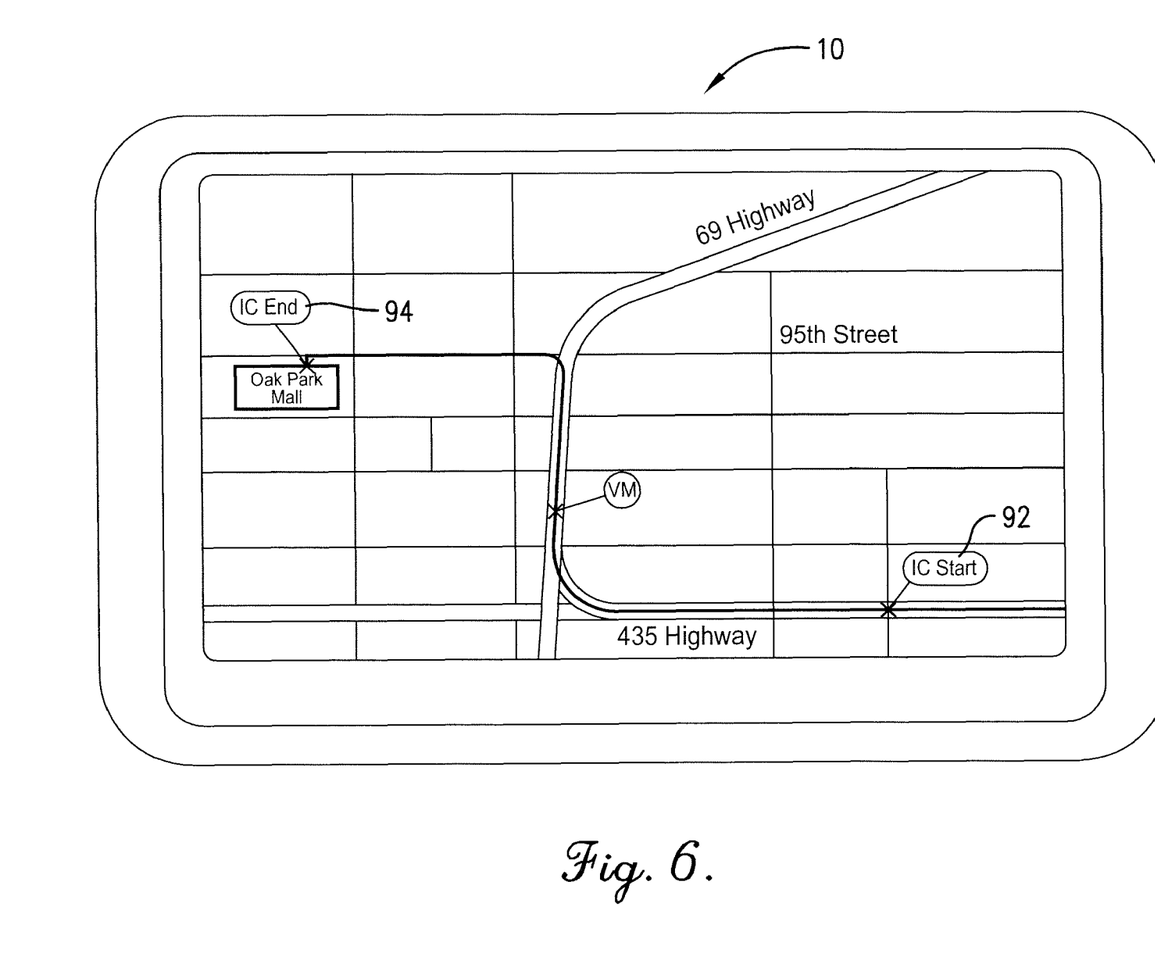
FIG. 6 is another sample screen display of the electronic device.

The computing device 18 or other component of the electronic device 10 may also display a representation of a communication along with a representation of when the communication was first received and when it ended. For example, as shown in FIG. 6, a marker 92 may show that a communication was first received when the device was at that location and a marker 94 may show that the communication ended when the device was at that location. The markers 92,94 may also indicate that the communication was an incoming call and denote the starting and ending times of the call.

The computing device 18 may also display the linked location data and identification information in other ways. For example, a user may wish to display some of the linked location data or identification information along with the coordinates of points along a path which the user has traveled. These collection of points, commonly referred to as a track log, are the electronic equivalent of laying down a bread crumb trail to mark a path. These points can then be shown strung together on a map page so the user can see where he or she has been. The computing device 18 may generate and display a track log with representations of the communications received by or transmitted from the device while at positions denoted by the tracklog.

The linked location data and identification information may also be displayed textually rather than on a map. For example, the computing device may display a list of communications sorted by the distance between the user's current location and the user's location when the communications were transmitted or received. Similarly, the list of communications may be sorted based on their distance from some user-specified location such as a shopping mall.

The device may also display a chronologically-ordered communication log. A user may then select a communication from the list to view the location of the device when the communication was received or transmitted. The location may be a textual description or shown on a map.

Embodiments of the present invention provide synergistic features not found in conventional location-enabled cell phones. For example, in some embodiments, the present invention may be used when a user receives a phone call or misses a phone call while at a specific location or while performing a specific task (e.g., while shopping at a shopping mall). The user may want to return the call later but may not remember the phone number of the calling party or the exact time the call was received. The user may remember, however, where he or she was when the call was received or missed. The user may operate the user interface 22 on the device to display a map such as the one shown in FIG. 4 showing makers denoting the positions of the device when incoming calls were received. The user can then scroll over any of the markers to obtain identification information for the call received when the device was at that location. The user can also consult a list of calls sorted based on their locations as discussed above and obtain identification for a call by selecting it from the list. The computing device may also automatically dial the phone number of the calling party, play a recorded voice mail, or perform some other function when the user selects or otherwise interacts with the marker.

The identification information for incoming communications and the linked location data may also be downloaded to an external personal computer or other computing device. A user may then display the identification information and location data to more closely analyze where the electronic device was located when incoming communications were received. For example, a number of the electronic devices may be used by a trucking company, package delivery company, taxi company, or any similar company to track the movement and communications of a fleet of vehicles. The identification information and linked location data may be downloaded from the electronic devices to an external computer every night or may be transmitted to the external computer by the transmitter or the communications component more frequently or even in real-time.

Parents may also analyze the identification information and location data created by electronic devices used by their children to keep track of where their children are when they are receiving phone calls. For example, a parent may download or otherwise receive the identification information and linked location data and determine that their child is impermissibly receiving phone calls from a friend while the child is at school or at a part-time job.

Figure 9:
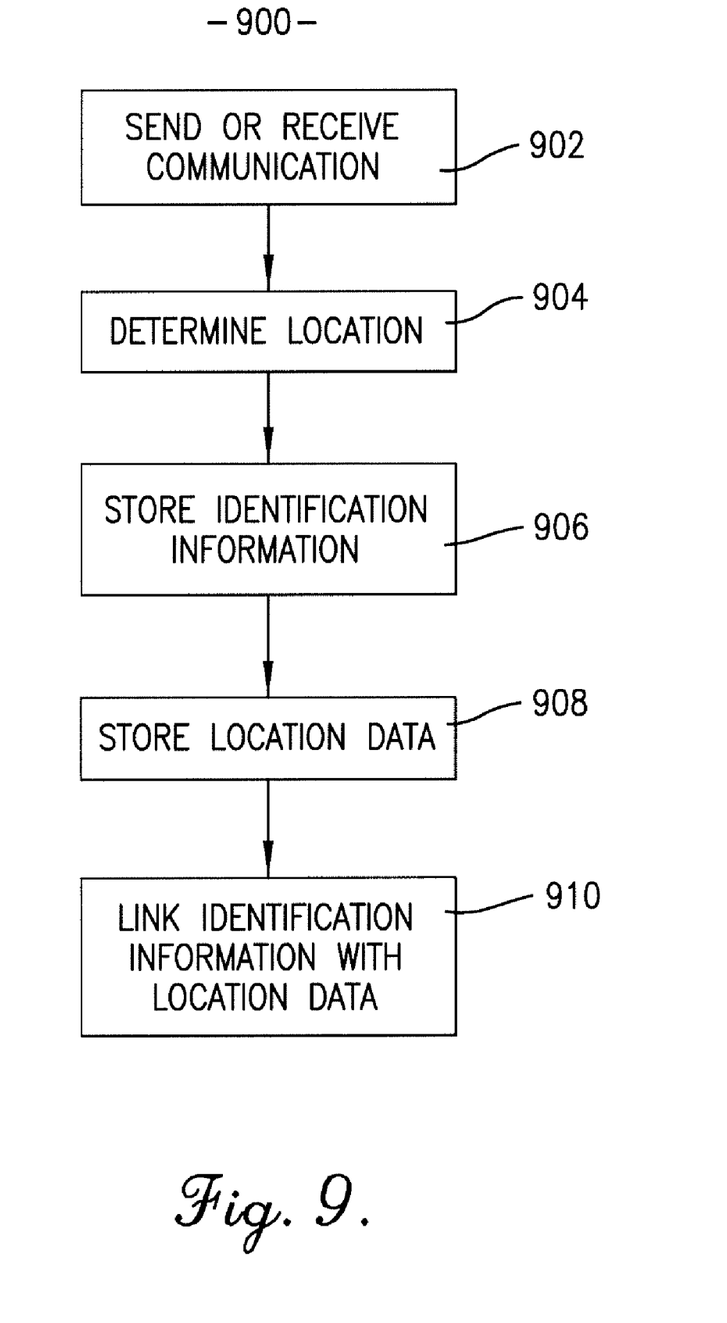
FIG. 9 is a flow diagram illustrating selected steps in an exemplary method of the present invention.

FIG. 9 illustrates certain steps in an exemplary method 900 of using the electronic device 10. The particular order of the steps illustrated in FIG. 9 and described herein can be altered without departing from the scope of the invention. For example, some of the illustrated steps may be reversed, combined, or even removed entirely.

In step 902, the communication component 12 of the electronic device 10 sends or receives a communication. As mentioned above, the communication may be an incoming or outgoing phone call, a missed incoming phone call, a voicemail message, a text message, an instant message, or any other type of communication that can be made with an electronic device. In a particular embodiment, the communication component receives an incoming phone call in step 902.

In step 904, the location-determining component 14 determines the location of the electronic device 10 at the time the communication was transmitted or received. For example, the location-determining component may determine the longitude and latitude of the device at the time an incoming phone call is received.

In step 906, the computing device 18 stores identification information for the communication. As mentioned above, the identification information may include the caller's phone number, the name or other identification for the caller, the day and time the call was received, and the duration of the call. The identification information may be stored in the memory 20 or other memory residing in or accessible by the computing device 18. The information may also be stored in an external computing device for later retrieval by the computing device 18.

In step 908, the computing device 18 stores location data corresponding to the location of the electronic device when the communication was received or transmitted. For example, the computing device 18 may store the latitude and longitude of the device when an incoming phone call is first received, the latitude and longitude of the device when the phone call has ended, and the latitudes and longitudes for several intermediate locations if the incoming call lasts for more than a few minutes. The computing device 18 may also perform a map-matching procedure and store map-based location data as described above.

In step 910, the computing device 18 then links the stored identification information with the stored location data. This may be done by adding a geocode or geotag to the identification information as explained above. The geotag may consist of the longitude and latitude of the device at the time the communication was received or transmitted.

Figure 10:
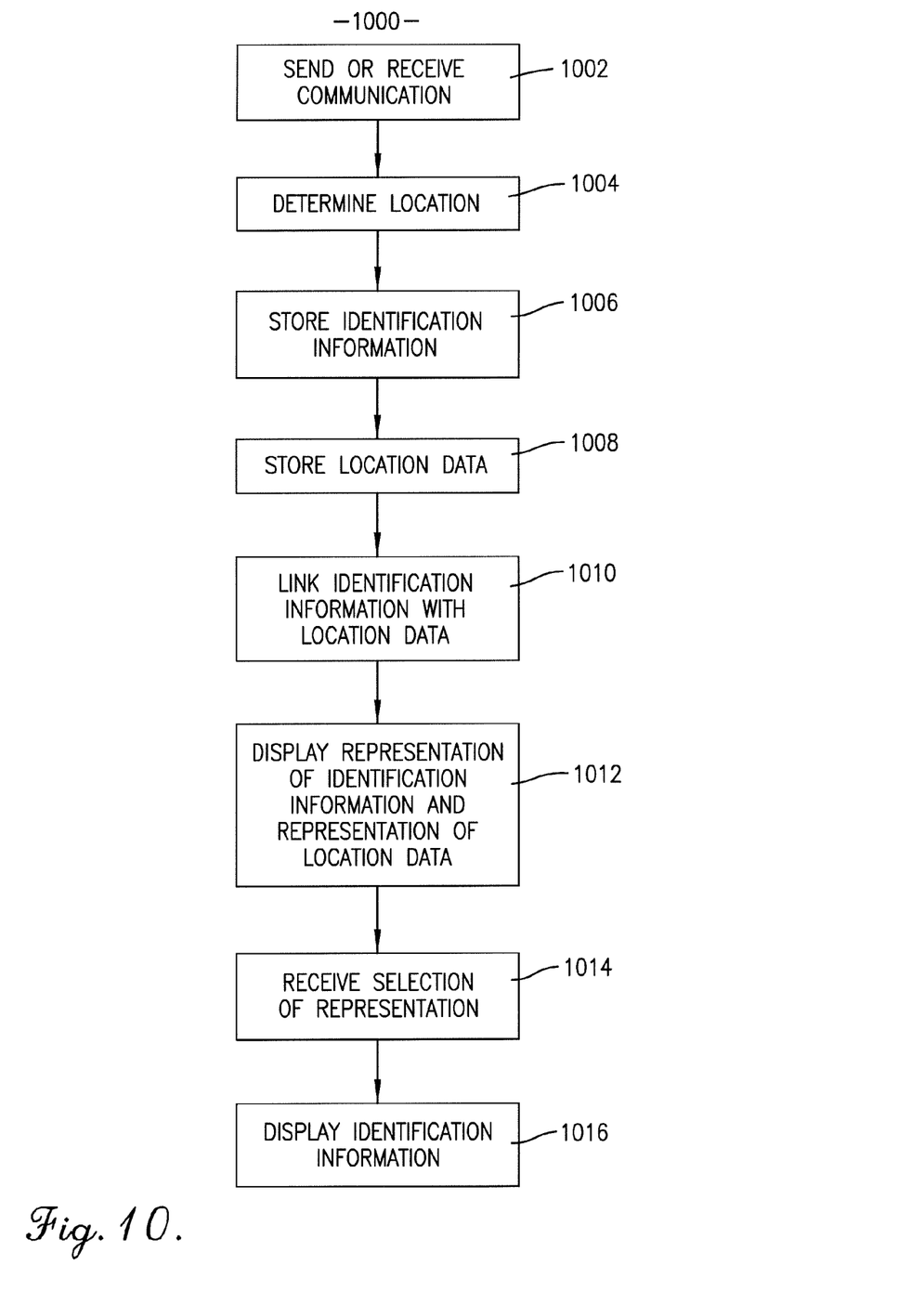
FIG. 10 is a flow diagram illustrating selected steps in another exemplary method of the present invention.

FIG. 10 illustrates certain steps in another exemplary method 1000 of using the electronic device 10. As with the method 900 illustrated in FIG. 9, the particular order of the steps illustrated in FIG. 10 and described herein can be altered without departing from the scope of the invention.

Steps 1002, 1004, 1006, 1008, and 1010 are essentially identical to steps 902, 904, 906, 908, and 910 discussed above. In step 1012, the computing device or other component of the electronic device 10 displays a representation of the identification information and a representation of the location data so that a user may more easily see where he or she was when a communication was received or transmitted. For example, a map with markers such as the ones shown in FIG. 4 may be displayed.

In step 1014, a user may scroll-over or otherwise select one of the representations to obtain more information about a communication. For example, a user may scroll-over the marker 74 or 82 in FIG. 4 to learn more about the incoming call denoted by the markers.

In step 1016, the computing device 18 or other component of the electronic device displays at least some of the identification information or location data linked to the marker. For example, as shown in FIG. 5, the computing device may display the overlay 90 to show the phone number, name, and other identification information associated with an incoming call.

Figure 11:
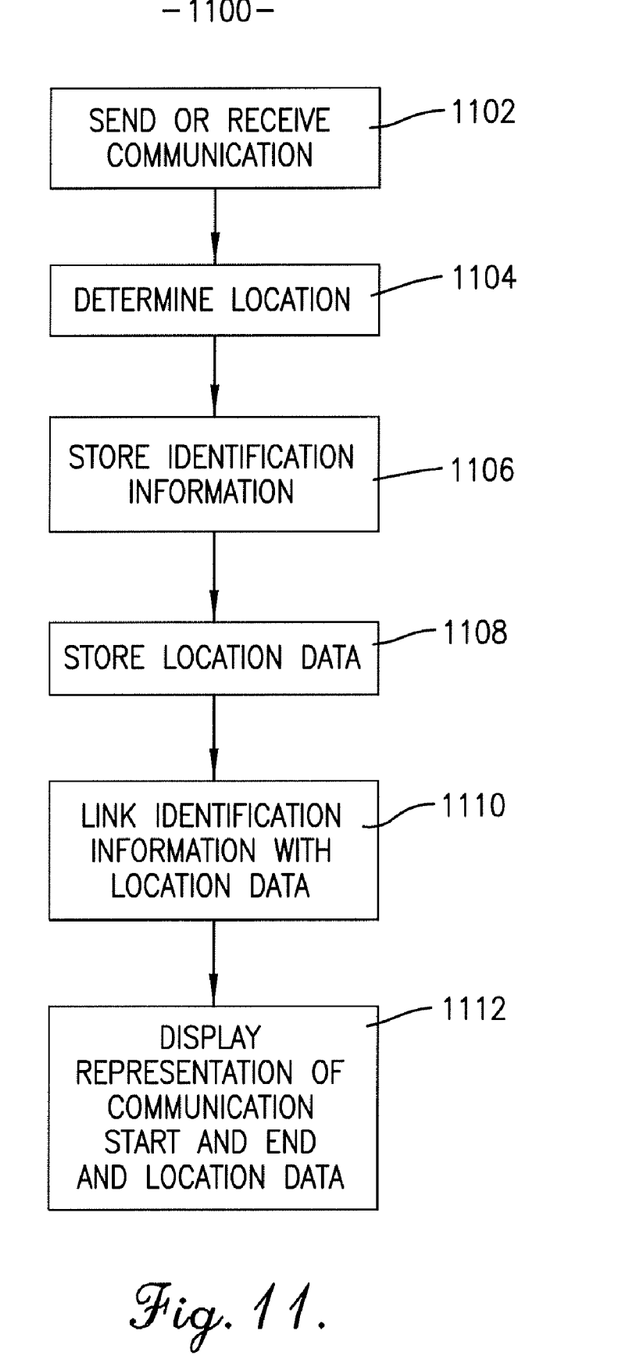
FIG. 11 is a flow diagram illustrating selected steps in another exemplary method of the present invention.

FIG. 11 illustrates certain steps in another exemplary method 1100 of using the electronic device 10. As with the methods 900 and 1000 illustrated in FIGS. 9 and 10, the particular order of the steps illustrated in FIG. 11 and described herein can be altered without departing from the scope of the invention.

Steps 1102, 1104, 1106, 1108, and 1110 are essentially identical to steps 902, 904, 906, 908, and 910 of FIG. 9. In step 1112, the computing device 18 or other component of the electronic device displays a representation of the communication along with a representation of when the communication was first received and when it ended. For example, as shown in FIG. 6, a marker 92 may show the location of the electronic device when a communication was first received and a marker 94 may show the location of the electronic device when the communication ended.

Although embodiments of the invention have been described with reference to the attached drawing figures, it is noted that equivalents may be employed and substitutions made herein without departing from the scope of the invention as recited in the claims. For example, embodiments of the invention may also link location data with identification information associated with outgoing phone calls and other outgoing communications. The identification information may identify the called party's phone number and name and the day and approximate time the call was made. The location data may identify the location of the device 10 when the outgoing communication was made and/or when it ended. Representations of the identification information and/or representations of the location data may then be displayed on a map. This permits a user to retrieve information about an outgoing communication even if the user does not remember when the communication was transmitted or the phone number or e-mail address of the receiving party. As long as the user remembers his or her approximate location when sending the communication, the user can retrieve all desired information about the communication.

Having thus described the preferred embodiment of the invention, what is claimed as new and desired to be protected by Letters Patent includes the following:

1. A mobile electronic device comprising:
   a communications component for receiving and transmitting communications;
   a location-determining component for determining locations of the electronic device;
   a computing device coupled with the communications component and the location-determining component for linking identification information related to an incoming communication with location data corresponding to an approximate location of the device at an approximate time the incoming communication was received by the communications component, wherein the computing device links the identification information with the location data by adding a geo tag to the identification information;
   a memory coupled with the computing device, the memory operable to store data associated with the linked identification information; and
   a display coupled with the computing device for plotting the stored identification information on a map,
   wherein the computing device is further operable to display at least some of the identification information when a user selects a representation of the identification information on the display.

2. The electronic device as set forth in claim 1, wherein the communication component is a cellular transceiver for transmitting and receiving mobile phone calls over a cellular telephone network and the location-determining component is a GPS receiver for receiving GPS signals from a plurality of GPS satellites and for determining the locations of the electronic device as a function of the received signals.

3. The electronic device as set forth in claim 1, wherein the incoming communication is an incoming phone call, a missed incoming phone call, a voice mail message, an incoming text message, or an incoming instant message.

4. The electronic device as set forth in claim 1, wherein the location data is latitude and longitude coordinates for the electronic device at the approximate time the incoming communication was received.

5. The electronic device as set forth in claim 4, wherein the computing device is further operable to compare the latitude and longitude coordinates to map data and to determine a map-based location of the electronic device at the approximate time the incoming communication was received.

6. The electronic device as set forth in claim 1, wherein the identification information is a phone number, an email address, or a caller ID associated with the incoming communication.

7. The electronic device as set forth in claim 1, wherein the computing device is further operable to store, within the memory, location data corresponding to a starting location of the electronic device when the incoming communication is first received, location data corresponding to an ending location of the electronic device when the communication is ended, and intermediate locations of the electronic device between the starting location and the ending location.

8. The electronic device as set forth in claim 7, wherein the computing device is further operable to display a track log showing representations of the starting location, the intermediate locations, and the ending location.

9. The electronic device as set forth in claim 1, further including a handheld housing for housing the communication component, the location-determining component, the computing device, and the display.

10. A method for tracking communications received by a mobile electronic device, the method comprising:
    receiving an incoming communication with the electronic device;
    determining a location of the electronic device at an approximate time the incoming communication was received;
    linking identification information related to the incoming communication to location data corresponding to the approximate location of the electronic device at the approximate time the incoming communication was received, wherein the identification information is linked with the location data by adding a geo tag to the identification information;
    storing data associated with the linked identification information within a computer-readable memory;
    plotting the stored identification information on a computer-generated map display; and
    displaying at least some of the identification information when a user selects a representation of the identification information on the display.

11. The method as set forth in claim 10, wherein the identification information is a phone number, an email address, or a caller ID associated with the incoming communication.

* * * * *